(12) United States Patent
Marban et al.

(10) Patent No.: US 7,111,641 B2
(45) Date of Patent: Sep. 26, 2006

(54) ZERO FLOW FIREPROOF QUICK DISCONNECT COUPLING

(75) Inventors: Joseph R. Marban, Newbury Park, CA (US); Steven D. Erickson, Ojai, CA (US)

(73) Assignee: Parker-Hannifin, Cleveland, OH (US)

( * ) Notice: Subject to any disclaimer, the term of this patent is extended or adjusted under 35 U.S.C. 154(b) by 0 days.

(21) Appl. No.: 10/983,808

(22) Filed: Nov. 8, 2004

(65) Prior Publication Data

US 2005/0109406 A1    May 26, 2005

Related U.S. Application Data

(60) Provisional application No. 60/525,011, filed on Nov. 25, 2003.

(51) Int. Cl.
*F16L 37/32* (2006.01)

(52) U.S. Cl. ................................. 137/614.03

(58) Field of Classification Search .......... 137/614.03, 137/614.04, 614.05
See application file for complete search history.

(56) References Cited

U.S. PATENT DOCUMENTS

| | | | | |
|---|---|---|---|---|
| 2,954,245 A | * | 9/1960 | Clark | 137/614.03 |
| 3,612,577 A | | 10/1971 | Pope et al. | |
| 3,869,132 A | | 3/1975 | Taylor et al. | |
| 4,269,389 A | | 5/1981 | Ekman | |
| 5,063,965 A | * | 11/1991 | Wilcox | 137/614.03 |
| 5,761,907 A | | 6/1998 | Pelletier et al. | |
| 5,845,945 A | | 12/1998 | Carstensen | |
| 6,149,075 A | | 11/2000 | Moertle et al. | |
| 6,173,968 B1 | | 1/2001 | Nelson et al. | |
| 6,675,833 B1 | * | 1/2004 | Maldavs | 137/614.05 |

FOREIGN PATENT DOCUMENTS

| | | |
|---|---|---|
| GB | 2175355 | 11/1986 |
| WO | WO 89/01586 | 2/1989 |

* cited by examiner

*Primary Examiner*—Kevin Lee
(74) *Attorney, Agent, or Firm*—Daniel J Whitman; Joseph J. Pophal

(57) ABSTRACT

In an improved quick disconnect coupling comprised of operator-actuated coupler and nipple assemblies, the former including an actuating sleeve, with the coupled assemblies having first and second sealing assemblies respectively, wherein the improvement comprises, in combination, that each of the sealing assemblies includes, in addition to the known torodial sealing element, a first non-continuous metallic backup ring and a second non-metallic backup ring interposed between the torodial sealing element and the first backup ring, both backup rings being of generally truncated triangular shape, in cross section; and a metallic insulating sleeve, surrounding the actuating sleeve while being substantially fully radially spaced therefrom, via a peripheral air gap, except for a band portion at one end thereof, this band being interference-fitted on a corresponding portion of the actuating sleeve and including a plurality of axially-extending, spaced, scalloped recesses defining an additional insulating air space and having spaced boundaries that provide surfaces for the interference-fitting.

30 Claims, 6 Drawing Sheets

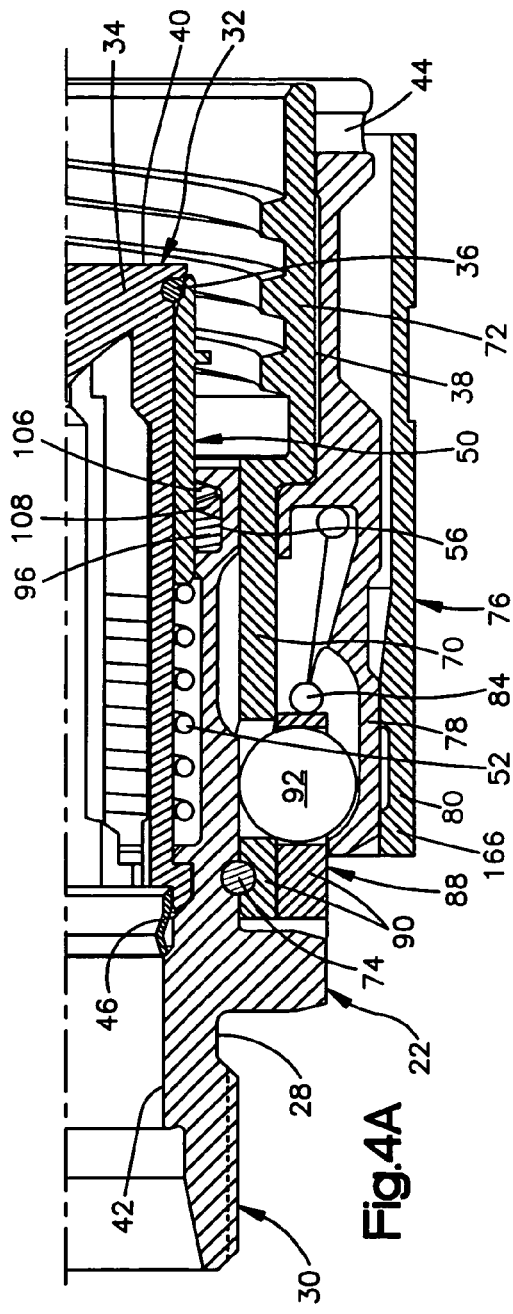
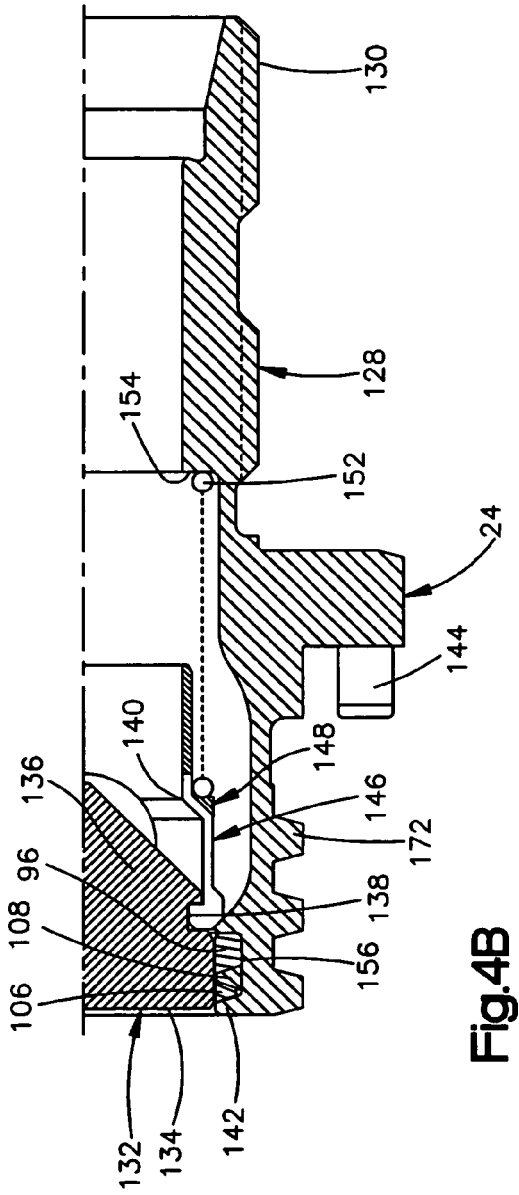
Fig.4A
Fig.4B

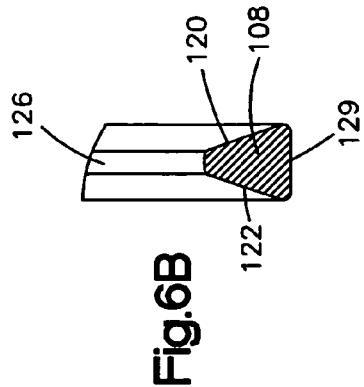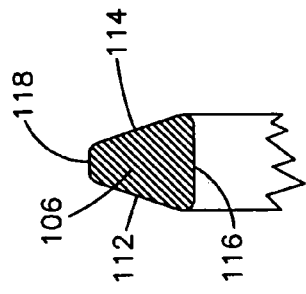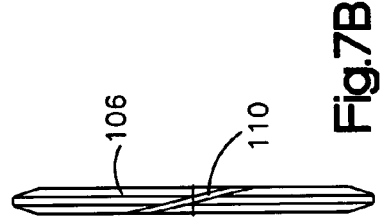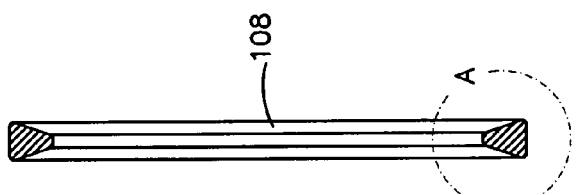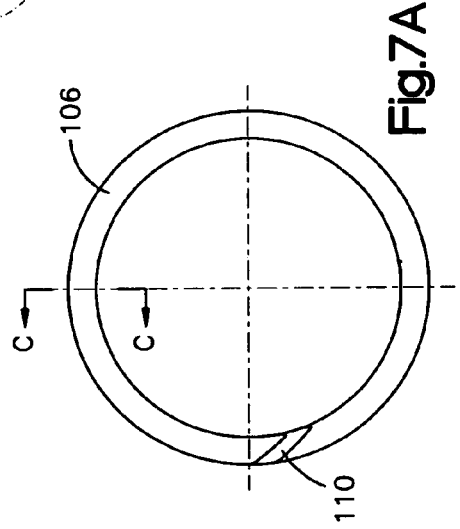

ZERO FLOW FIREPROOF QUICK DISCONNECT COUPLING

CROSS-REFERENCE TO RELATED CASES

The present application claims the benefit of the filing date of U.S. Provisional Application Ser. No. 60/525,011, filed Nov. 25, 2003, the disclosure of which is incorporated herein by reference.

FIELD OF THE INVENTION

The present invention pertains to Zero Flow Fireproof Quick Disconnect Couplings utilized in hydraulic applications that are required to function in severe high temperature working environments. Specifically, this invention pertains to improvements in several structures thereof, particularly the addition of metal seals and an insulation sleeve that allow such couplings to meet the fire resistance and also the fireproof requirements, of SAE AS1055 and other such related industry specifications, with zero or very low fluid cooling flow.

BACKGROUND OF THE INVENTION

A hydraulic system QDC (Quick Disconnect Coupling), comprised of operatively connected nipple and coupler assemblies, provides for ease of maintenance when servicing an aircraft or a vehicle. Such QDCs permit the removal/replacement of associated equipment with minimal or preferably no loss of hydraulic fluid.

Existing, commercially available, Thread-Lok QDCs provide today's aerospace and other critical fluid handling systems with quick disconnect capabilities, self-sealing action and visual/touch indication of fully coupled positions. Such Thread-Lok couplings offer simple one hand operation as well as reliable performance during the maintenance of fluid handling systems. These thread-together couplings provide the mechanical advantage required for coupling under higher pressures.

One of the more difficult challenges that QDC manufacturers face today is the ever increasing demand for such couplings to be resistant to onboard fire during flight or operation. Existing industry specifications, including AS 1055, establish test criteria for couplings to be fire resistant and even fire proof. During a fire resistance test, the QDC is exposed to flame temperatures of over 2000 degrees F. and must be able to contain leakage satisfactorily at the coupling's normal internal pressure and flow rate for a minimum of five minutes. In order to be considered fire proof, a QDC must pass the same test conditions, but for a minimum of fifteen minutes. A key parameter for such couplings to pass this test is the ability of the internal fluid flow to carry away the heat generated and subsequently transferred by the flames. Today, many end users are now even requesting QDCs that can pass this test at normal operating pressures without the benefit of any internal fluid flow.

The noted problem has been addressed in the prior art and a fire resistant sealing ring combination is set forth in U.S. Pat. No. 3,869,132 to Taylor et al., and involves the use of a metallic static seal "C" ring. While the concept of the use of an elastomeric seal for providing the main sealing feature under normal operation and the use of a metal seal during a fire is similar to the QDC of the present invention, the present invention involves the use of a radial type seal, unlike that of this reference which involves the use of a face seal design. The metal "C" ring and other variations set forth in this reference require substantial force for actuation and cannot be readily adapted for use in quick disconnect applications since this type of metal seal requires not only substantial force to operate but also has a narrow functional scope.

U.S. Pat. No. 4,269,389 to Ekman, while pertaining to a quick disconnect device, uses sealing philosophies that are vastly different from those of the present invention. Similarly, while the structure set forth in U.S. Pat. No. 5,845,945 to Carstensen, in FIG. 3, pertains to a metal wedge back-up ring seal and an O-ring similar to that of the present invention, the concept is used in this reference is used in a single connection application mechanism that allows the connection of two tubes and does not contain a feature for the removal of the two tubes as is typical in a QDC and thus represents a totally different application. The noted arrangement of the seal and back-up ring is solely to eliminate the gap between the tapered female member and the tapered male member due to tolerances and thus functions only to provide sealing but does not include a fire resistant function.

While the structure of U.S. Pat. No. 6,173,968B1 to Nelson et al. includes a metal wedge back-up seal an O-ring arrangement similar to that of the present invention, the back-up ring has only one wedge angle that causes the back-up ring to block the extrusion gap formed between the male and female members. In contrast, the present invention seal ring utilizes two angles, with the additional angle allowing for increased force between the two parts and also includes a secondary back-up seal ring of a high strength and high temperature-resistant material. The noted reference design only operates up to about 500 degrees F. as compared with that of the present invention which has to operate in fire environments that have temperatures as high as 2250 degrees F. A key feature in this reference is that it utilizes a relatively large extrusion gap whereas in the present invention the extrusion gap is deliberately kept small.

The structure set forth in WO 89/01586 to Millard is again intended for connecting together two pipes. The noted coupling is unlike a standard QDC that can be coupled without requiring any tools. This reference requires the parts to be bolted together and the seal design is different from that of the present invention. Similarly, the structure of U.S. Pat. No. 3,612,577 to Pope et al., involves concentric pipes that uses multiple static seals with supporting back-up rings. This differs from the present invention in that the reference structure does not provide a coupling function. The only item of relevance is that the metal back-up ring has the form of a wedge. However, this back-up ring is welded in place whereas the back-up ring of the present invention is free floating and is designed to slide and move to its actuation position, when pressurized. Finally, UK patent application GB 2175355A appears to pertain to an oil well structure for creating a seal. While a wedge is added to the structure to prevent extrusion of the seal as the parts are pressed together it includes no similar features with respect to those of the present invention.

Turning now to heat shield assemblies, U.S. Pat. No. 5,761,907 to Pelletier, et al., also assigned to the assignee of the present invention, pertains to a thermal gradient dispersing heat shield assembly and the metal insulating sleeve thereof serves a similar function to heat shield utilized in the present invention. However, this reference patent pertains to non-analogous art, namely by being used in a fuel nozzle used to inject fuel in a jet engine. This reference seems to suggest that this is an incremental improvement to a prior art structure that also contains a heat shielding structure. Air gaps are, in fact, included in many aerospace and nonaerospace parts to serve as thermal barriers. The insulating sleeve of the present invention works in combination with other components in the QDC to block both radiation and convective heat transfer that promotes the breakdown of the seals that leads to QDC failure. The two noted applications are vastly different, with the insulation characteristics being the only somewhat similar feature. Similarly, the structure in U.S. Pat. No. 6,149,075 to Moertle et al. pertains to a method and apparatus for shielding heat from a fuel nozzle stem, in a non-analogous art, and provides a complete void for reducing heat transfer. As already noted, the insulation sleeve in the present invention works in conjunction with other parts in the QDC to block radiation and convection heat from causing heat leaks.

None of the discussed prior art structures pertains to the combination of features used in the present invention to achieve the requirements set forth in the noted industry standards.

SUMMARY OF THE INVENTION

Accordingly, in order to overcome the deficiencies of the prior art quick disconnect couplings, the present invention provides an improved Zero Flow Fireproof Quick Disconnect Coupling structure by using a unique pair of backup rings for the elastomeric seals of both the male nipple and the female coupling assemblies in combination with a novel, additional, external heat shield that permit the quick disconnect coupling of this invention to successfully meet the conditions of industry specifications such as SAE AS 1055.

Specifically, in terms of structure, this invention pertains to a zero flow fireproof quick disconnect coupling, for supplying fluid from a pressure source to an output conduit without leakage, the quick disconnect coupling being comprised of a female coupler assembly and a male nipple assembly adapted to be operatively interconnected via complementary fastening members; wherein the female coupler assembly includes: i. a first, generally tubular housing having a first axial through bore; ii. a generally cylindrical support member having a first portion thereof affixed to and enveloping an axial portion of the first housing, and a second portion provided with a first fastening member; iii. a hollow sleeve member, normally biased to a first position, located within an axial portion of the first housing bore; iv. a first sealing assembly, including a first elastomeric seal member, for sealing the sleeve member, relative to the first generally tubular housing; v. a stop assembly, including a generally tubular member having one end thereof affixed within the first through bore and extending through the sleeve member, the stop assembly having a further closed end and having a peripheral seal member adapted to seal the further closed end relative to a juxtaposed portion of the sleeve member at the first position; and vi. an actuating sleeve, normally biased to a second position, surrounding the support member, the actuating sleeve being adapted for manual axial movement in a direction opposite to the second position; and wherein the a male nipple assembly includes: vii. a second, generally tubular housing having an axial second through bore and a second fastening member; viii. an axially movable poppet, located within the second through bore, normally biased to a third position; and ix. a second sealing assembly, including a second elastomeric seal member, for sealing the poppet, relative to the second through bore, in at least the third position; wherein the improvement comprises in combination: a. the first and second sealing assemblies being located in recesses in the first and second tubular housing bores respectively, with each recess including a first end wall having a predetermined first angle relative to the axial extent of the housings, each of the first and second elastomeric seal members taking the form of elastomeric toroidal sealing members and being located adjacent to second end walls axially spaced from the first end walls; b. each of the first and second sealing assemblies further including: i. a scarf-cut metallic first backup ring, of generally truncated triangular shape, in cross section, with the base thereof serving as the internal peripheral surface thereof, and a first angled side thereof being parallel with and abutting the first end wall of each of the sealing assembly recesses; ii. a non-metallic second backup ring, of generally truncated triangular shape, in cross section, with the base thereof serving as the outer peripheral surface thereof, and a third angled side thereof being parallel with and abutting a second angled side of the first backup ring, while a fourth angled side of the second backup ring is parallel with and abuts the side of the elastomeric toroidal sealing member opposite the side thereof that abuts each of the recess first end walls; and c. a metallic insulating sleeve, surrounding the actuating sleeve while being radially spaced therefrom, via a peripheral air gap, except for a band portion, at one end thereof, the band portion being interference-fitted on a corresponding portion of the actuating sleeve.

In one version, the metallic first backup ring is comprised of an aluminum nickel bronze alloy and the non-metallic second backup ring is comprised of a polyetheretherketone (PEEK) material composition.

In a differing version, the non-metallic second backup ring is comprised of a VESPEL.

In a further version, the metallic insulating sleeve is comprised of a stainless steel alloy.

In one version the band portion of the insulating sleeve is provided with a plurality of axially extending, spaced scalloped recesses having spaced boundaries that provide a plurality of surfaces for the interference-fitting of the insulating sleeve around the actuating sleeve. Preferably, the scalloped recesses are equally circumferentially spaced and axially directed, with the boundaries having raised surfaces utilized for the interference-fitting. Generally, the interference-fitting is accomplished via press-fitting, with each of the axially directed scalloped recesses defining an additional insulating air space between the insulating and actuating sleeves. Furthermore, the exterior peripheral surface of the insulating sleeve is provided with a pattern, with the pattern preferably taking the form of a knurl.

In still another version the angulations of the first and second sides of the first back up ring are substantially equal. In yet a differing version, the angulations of the third and fourth sides of the second back up ring are substantially equal. Preferably, the angulations of the first, second, third and fourth sides are all substantially equal.

In a still a further version, the predetermined first angles of the first end walls of the first and second sealing assemblies are oppositely directed.

In an added version the axial arrangement of the toroidal seal member, together with the first and second backup rings, in the female coupling assembly, is oppositely directed with reference to the axial arrangement of the toroidal seal member and the associated first and second backup rings in the male nipple assembly.

In yet another version the hollow sleeve member of the female coupler is comprised of an aluminum bronze alloy.

In a variation of the present invention, in a quick disconnect coupling, for supplying fluid from a pressure source to a pressure receiver without leakage, the coupling is comprised of a coupler assembly and a nipple assembly adapted to be operatively interconnected by an operator; with the female member including: i. a first, generally tubular housing having a first longitudinal through bore; ii. a generally cylindrical support member having one portion thereof affixed to and surrounding a longitudinal portion of the housing; iii. a hollow sleeve member, normally biased to a first position, located within a longitudinal portion of the first housing through bore; iv. a first sealing assembly, including a first seal member, for sealing the sleeve member, relative to the first housing, the first sealing assembly being located in a first recess extending into the first housing bore; v. a stop assembly, including a generally tubular member having one end affixed within the first bore and extending through the sleeve member, the stop assembly also having another end, the another end incorporating a peripheral seal member for sealing the another end, relative to an adjacent portion of the sleeve member, when at the first position; vi. an actuating sleeve, normally biased to a second position, surrounding the support member, the actuating sleeve being adapted for axial movement, by an operator, in a direction opposite the second position; with the nipple assembly including: vii. a second, generally tubular housing having a longitudinal second through bore; viii. a longitudinally movable poppet, located within the second through bore, normally biased to a third position; ix. a second sealing assembly, including a second seal member for sealing the poppet, relative to the second through bore and the sleeve member, the second sealing assembly being located in a second recess extending into the second housing bore; wherein an improvement comprises in combination: a. each of the first and second recesses for the respective first and second sealing assemblies, including a first end wall, angled relative to the longitudinal extents of the housings, with each of the first and second seal members taking the form of an elastomeric toroidal sealing member and being located adjacent to second end walls, in the housing recesses, longitudinally spaced from the first end walls; b. each of the first and second sealing assemblies further including: i. a non-continuous metallic first backup ring, of a generally triangular shape, in a radial plane passing through the longitudinal axis of the assemblies, with a base surface thereof serving as the internal peripheral surface thereof, and a first angled side thereof being complementary with the first end walls of each of the sealing recesses; ii. a non-metallic second backup ring, of generally truncated triangular shape, in a radial plane passing through the longitudinal axis of the assemblies, with a base surface thereof serving as the outer peripheral surface thereof, and a third angled side thereof being complementary with a second angled side of the first backup ring, while a fourth angled side of the second backup ring is complementary with the side of the O-ring that is opposite to the side thereof that abuts each of the recess first end walls; and c. a metallic insulating sleeve, surrounding the actuating sleeve while being substantially fully radially spaced therefrom, via a substantially continuous peripheral insulating air gap, except for a band portion, at one end of the insulating sleeve, with the band portion being press-fitted on a corresponding portion of the actuating sleeve, in a manner so as to provide a plurality of further separate longitudinally extending insulating air gaps.

In a differing version, the hollow sleeve member of the female coupling is comprised of an aluminum bronze alloy.

In a further version, the metallic first backup ring is provided with a scarf cut and is comprised of an aluminum nickel bronze composition, while the non-metallic second backup ring is comprised of either a polyetheretherketone composition material or of a VESPEL composition material.

In another version thereof the metallic insulating sleeve is comprised of a stainless steel alloy material.

In an additional version, the further longitudinally extending insulating air gaps are formed via a plurality of longitudinally extending, spaced, scalloped recesses on the inner surface of the band portion, with the scalloped recesses including spaced boundaries that form a plurality of surfaces for the press-fitting of the insulating sleeve around the actuating sleeve. Preferably, the exterior peripheral surface of the insulating sleeve is provided with a knurled pattern.

In a final version the angulations of the first, second, third and fourth sides of the first and second backup rings respectively, are substantially equal and the longitudinal placement of the seal member, together with the first and second backup rings in the coupling assembly, is of mirror image relative to the placement of the seal member and the first and second backup rings of the nipple assembly.

The previously described advantages and features, as well as other advantages and enhancements, will become readily apparent from the detailed description of the preferred embodiments that follow.

BRIEF DESCRIPTION OF THE DRAWINGS

FIG. 4A is a longitudinal, vertical sectional view of the uncoupled improved coupler portion of the QDC of the present invention;

FIG. 4B is a longitudinal, vertical sectional view of the uncoupled improved nipple portion of the QDC of the present invention;

FIG. 6A is an enlarged, vertical sectional view of an improved seal first backup ring of the seal assembly of the QDC of the present invention;

FIG. 6B is an enlarged detail of area A of FIG. 6A;

FIG. 7A is an enlarged side view of an improved seal second backup ring of the seal assembly of the QDC of the present invention;

FIG. 7B is an end view of the improved seal second backup ring of FIG. 7A;

FIG. 7C is an enlarged sectional view, taken at section C—C of FIG. 7A;

DETAILED DESCRIPTION OF THE INVENTION

Figure 1B:
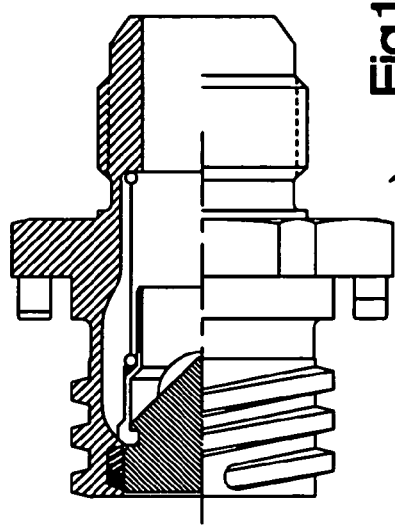
FIG. 1B is an uncoupled nipple portion of a prior art QDC.
Figure 1C:
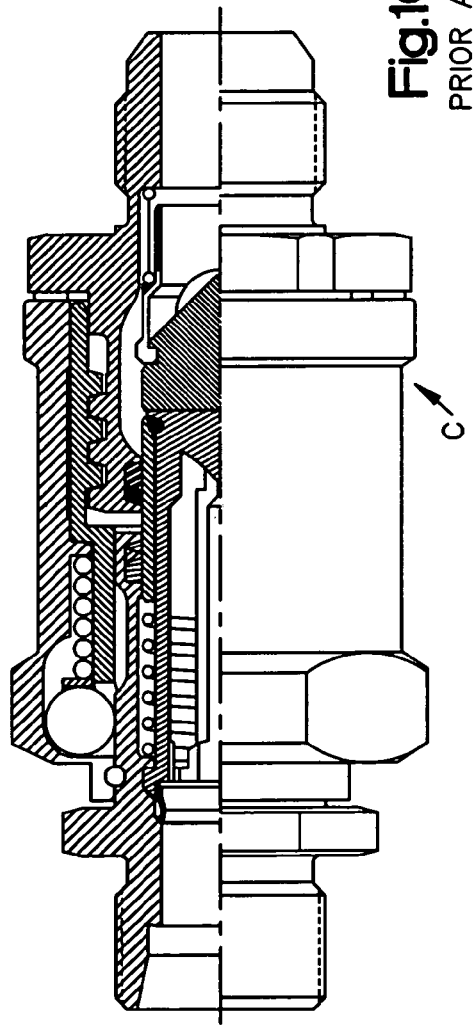
FIG. 1C shows a coupled prior art QDC, utilizing the coupler and nipple portions of FIGS. 1A and 1B respectively.
Figure 1A:
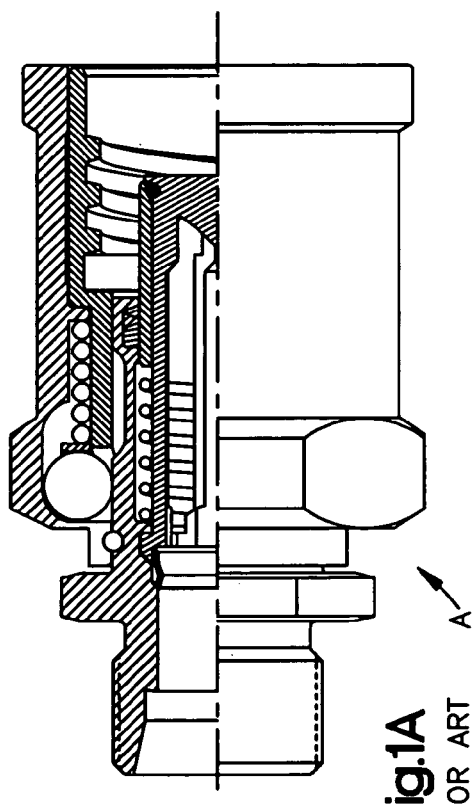
FIG. 1A is an uncoupled coupler portion of a prior art QDC (Quick Disconnect Coupling)

Referring now to the several drawings, illustrated in FIG. 1A is a typical uncoupled coupler of female portion A of a prior art QDC (Quick Disconnect Coupling), with FIG. 1B illustrating a typical uncoupled nipple or male portion B of a prior art QDC, while FIG. 1C illustrates a typical coupled assembly C of prior art QDC components A and B. The mating thread portions of components A and B, in assembly C, are locked by tang and slot engagement in a well-known manner. These typical prior art QDC components and coupling are typical of those illustrated and discussed in more detail, on pages 1–3 of Catalog 106-THREAD (dated September 1996) as the Stratoflex Symetrics Thread-Lok, Quick Connect Valve Couplings, manufactured and marketed by the Parker-Hannifin Corporation. The threaded coupling used to illustrate the baseline or existing prior art structures is but one of a multiple of different style QDCs where the present invention can be implemented. These other couplings can, for example, include single shut-off, Indi-lok, non-latching or other such designs, etc. These noted other QDCs contain sealing arrangements similar to those of the present invention, but vary mainly in the method for connecting the male and female couplings.

Figure 4C:
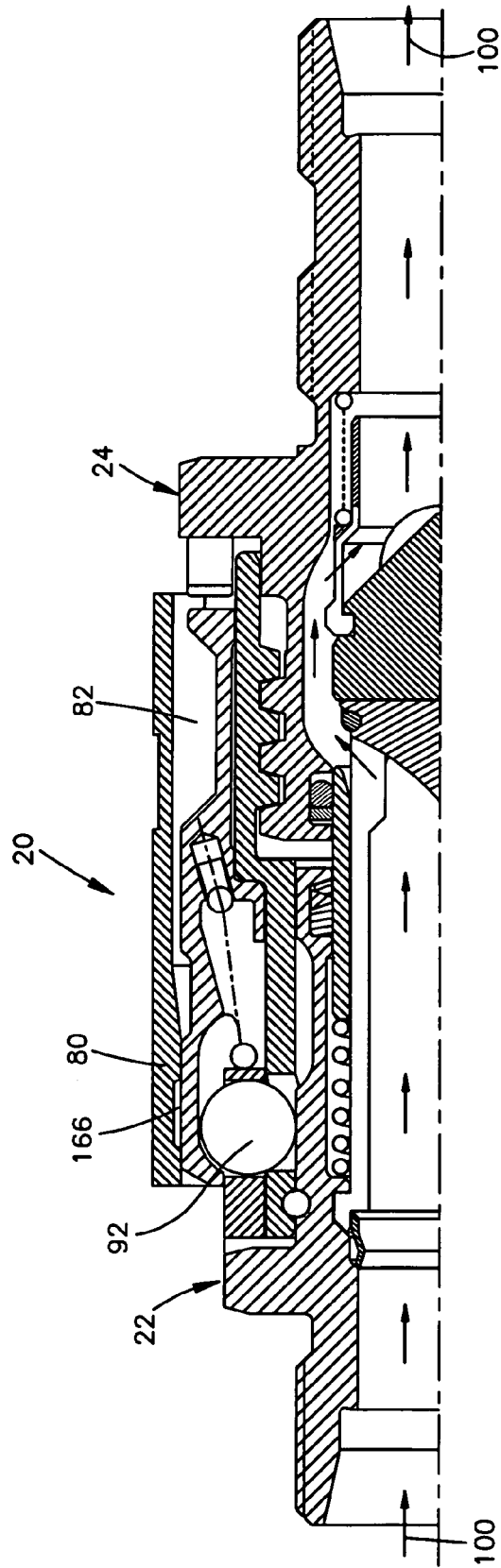
FIG. 4C is a longitudinal, vertical sectional view of the coupled improved QDC of the present invention, utilizing the coupler and nipple portions of FIGS. 4A and 4B, respectively.
Figure 8B:
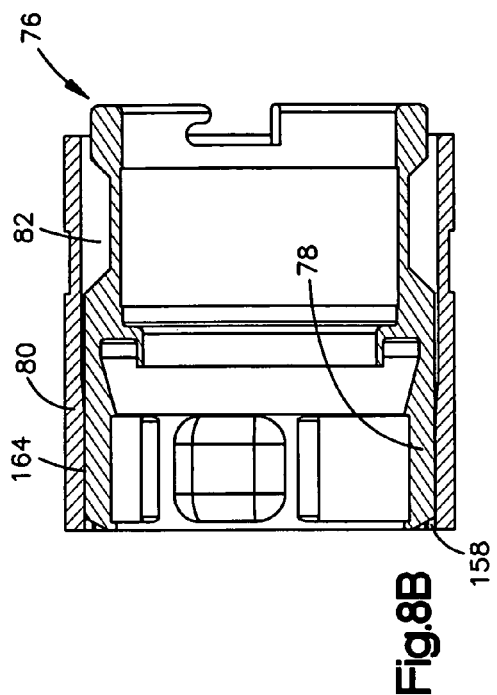
FIG. 8B is a longitudinal, vertical cross-sectional view of the actuating sleeve assembly of FIG. 8A.

The "Zero Flow Fireproof" QDC (hereinafter "Zero Flow" FP QDC) structures and assemblies of the present invention represent a unique improvement over the noted prior art QDCs. Specifically, as shown in FIGS. 4A, 4B and 4C, the latter illustrates Zero Flow FP QDC assembly 20 comprised of Zero Flow FP QDC coupler or female assembly 22 operatively interconnected with Zero Flow FP QDC nipple or male assembly 24.

Turning first to Zero Flow FP QDC coupler assembly 22, FIG. 4A illustrates same as being comprised of a generally tubular housing 28 having an outer, generally threaded, end fitting 30, adapted for connection with a source of fluid under pressure (not shown). Fixedly located within a central bore portion 42 of housing 28 is a stop assembly 32 consisting of a generally tubular stop member 34 and an elastic, toroidal seal member 36, such as an elastomeric toroidal sealing element of preferably a Nitrile composition or the like, the latter being received within an outer annular recess 38 in stop member closed end portion 40. An outer open end of stop member 34 is fixedly retained, in bore 42, via a fixed stop retainer 46. Axially slidably retained on an inner end of stop member 34 is a generally tubular sleeve 50 whose inner end is normally resiliently biased into sealing relationship with seal member 36 via a sleeve spring 52 surrounding an outer portion of stop member 34.

Coupler housing 28 further includes a sealing assembly pocket or recess 56 (best seen in FIG. 5) having an outer, generally vertical wall 58 that blends smoothly into a generally cylindrical central portion 60, which in turn, smoothly blends into an angled, relative to sleeve 50, inner wall 62. Located within recess 56 is a sealing assembly 66 which will be discussed in more detail hereinafter.

Surrounding an inner end portion of housing 28 and enveloping pocket 56, is a generally cylindrical support member 70 which also includes an enlarged diameter internally-threaded portion 72. In turn, support member 70, together with its threaded portion 72, serve to journal thereon, for axial movement relative thereto, an actuating assembly 76 comprised of an inner actuating sleeve 78 and an affixed, juxtaposed, superimposed insulating sleeve 80, which will also be discussed in more detail hereinafter. Support member 70 is affixed to housing 28 via an annular retaining ring 74.

Actuating assembly 76, which can move axially relative to support member 70, is axially biased in one direction via an actuating spring 84 located within actuating sleeve 78. An outer end of spring 84 is biased against an inner wall portion of a generally annular spacer member 88 which in turn, together with support member 70, include several recesses 90 that serve, together with portions of inner actuator sleeve 78 and portions of housing 28, to confine at least two opposed rolling elements, such as balls or spheres 92, that act to facilitate the axial movement of actuating assembly 76, relative to support member 70.

Turning now to Zero Flow FP QDC nipple assembly 24, FIG. 4B illustrates same as being comprised of a generally tubular housing 128, having an outer, generally threaded, end fitting 130, adapted for connection with a receiver of fluid under pressure (not shown). The inner end portion of housing 128 is also provided with another exterior threaded portion 172, adapted and sized for operative interconnection with coupler thread portion 72, in a manner to be described hereinafter. Located within a central bore portion 142 of housing 128 is a poppet 132 consisting of a generally cylindrical hub portion 134 having an outwardly-directed, integral generally cone-shaped portion 136, with the latter being separated from the former via a peripheral groove 138, with groove 138 serving to retain an inner end portion of a retainer 146, having a frusto-conical intermediate portion 144 that serves to locate a spacer 148 that in turn receives one end of a biasing spring 152 whose other end abuts a shoulder 154 in housing bore portion 142.

Figure 5:
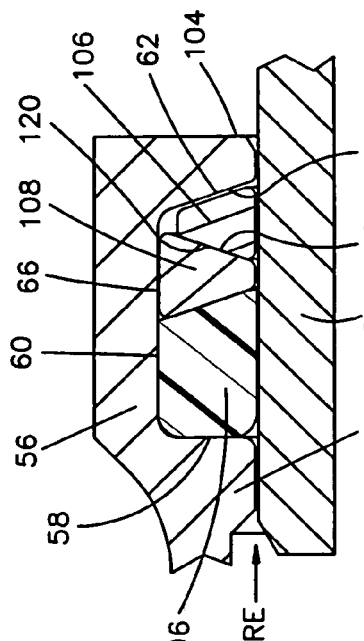
FIG. 5 is an enlarged section, showing the improved seal assembly of the QDC of the present invention.

Nipple housing 128, exteriorly of cylindrical poppet hub portion 134, further includes a pocket or recess 156, which is the mirror image of sealing pocket 56, best seen in FIG. 5, i.e., pocket or recess 156 has a generally vertical inner wall 58 that blends smoothly into generally cylindrical central portion 60 which in turn blends smoothly into an angled outer wall 62. Located within recess 156 is a sealing assembly 166, not shown per se since it is which is the mirror image of sealing assembly 66 that will be discussed, in detail, shortly.

Continuing on to Zero Flow FPQDC assembly 20, FIG. 4C illustrates assembly 20 that results from the operative interconnection of coupler assembly 22 and nipple assembly 24 by virtue of an operator physically intermeshing their respective threaded portions 72 and 172 as well as the operative engagement of opposite nipple tangs 144 with their respective coupler slots 44 in a manner well known in the art.

In terms of the operation of Zero Flow FP QDC 20, the axial flow of pressurized fluid, which of course can flow bidirectionally, for descriptive purposes here, is indicated by a plurality of arrows 100, as flowing from left to right, as shown in FIG. 4C. Specifically, nipple housing 128 engages with coupler sleeve 50 and forces same axially to the left, thereby producing an opening between coupler stop member closed end portion 40 and its associated coupler sleeve 50, as well as also displacing nipple cylindrical poppet portion 132 to the right, thus allowing pressurized fluid 100 to flow out of coupler assembly 22 into, through and subsequently out of nipple assembly bore portion 142. Basically, in order to permit the required flow, the valves within each of coupler assembly 22 and nipple assembly 24 open simultaneously, in a manner well known in the art.

As already noted, the Zero Flow FP QDC 20 of the present invention presents a unique improvement to the current QDC design technology set forth in FIGS. 1A, 1B, 1C, 2 and 3. It addresses the problem faced by existing and/or prior art QDCs by providing two main improvements not heretofore utilized. The main feature improvements include a metal seal 106 and insulation in the form of an insulating sleeve 80. Specifically, Zero Flow FP QDC 20 contains design features that allow it to meet fire resistance and also fireproof requirements of AS 1055 with zero cooling flow. Thus, the Zero Flow FP QDC 20 structure addresses some of the fire design problems present in the current standard QDC.

Figure 2:
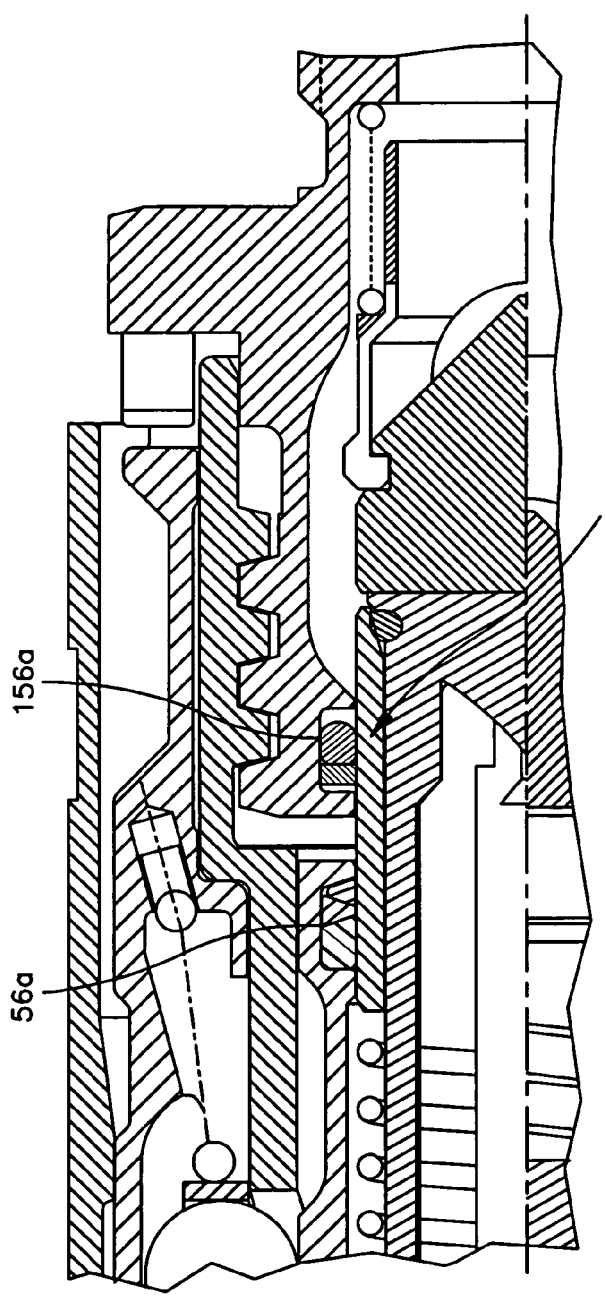
FIG. 2 is an enlarged longitudinal cross-sectional central portion of FIG. 1C, showing heat transmittal from the outside (hot side) to the inside (cold side) across several of the QDC components.
Figure 3:
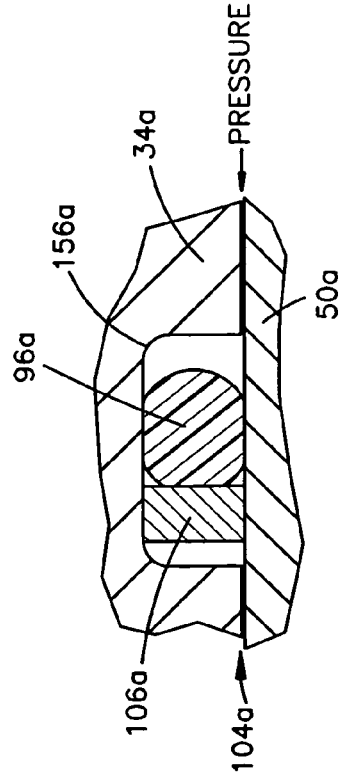
FIG. 3 is an enlarged section showing a typical seal groove and seal assembly of the FIG. 2 construction and also showing the O-ring seal extrusion gap.

The most vulnerable area of both the standard QDC and the Zero Flow FP QDC, during a fire, are the elastomeric seals. As shown in prior art FIGS. 1A, 1B, 1C, 2 and particularly in FIG. 3, each of coupler assembly A and nipple assembly B utilizes, within square-sided pockets 56a and 156a, respectively, an elastomeric seal, such as a toroidal sealing element 96a and a preferably cylindrical, square-sided, backup ring 102a typically of a Teflon type material or the like, as best shown in FIG. 3 which depicts an elastomeric toroidal sealing element 96a and its associated backup ring 102a residing in pocket 156a in coupler housing 134a as bounded by coupler sleeve portion 50a. Thus, each pair of seals 96a and backup rings 102a is placed in seal grooves or pockets 56a, 156a, located in coupler and nipple assemblies A and B, respectively. When assemblies A and B are coupled into the resulting QDC C (FIG. 1C), these two seal grooves 56a, 156a are in close proximity (FIG. 2) to each other. Both sets of seals 96a need to be protected during a fire test. During a fire, the housing cavities (FIG. 2) that contain seals 96a slowly heat up and the toroidal sealing elements 96a start to loose their structural strengths and start behaving more like a non-Newtonian fluid. Backup rings 102a also heat up and lose strength. Seals 96a will continue to soften with increasing heat absorption until they reach the condition where they can extrude through an extrusion gap 104a, best seen in FIG. 3.

The variables affecting the point when toroidal sealing elements 96a and backup rings 102a will extrude include: the softness of the material (analogous to durometer), the size of the extrusion gap 104a (diametral clearance), and the internal pressure level. The behavior of toroidal sealing elements, in conditions where the toroidal sealing element hardness, pressure level and extrusion gap are known, have been calculated and are well known in the art. It is also known that as the internal pressure increases, the extrusion gap must become smaller in order to prevent the toroidal sealing element from extruding and losing its capacity to contain fluid leakage. In addition, soft toroidal sealing elements will extrude more readily than harder ones.

The next significant factor is just how the toroidal sealing elements and backup rings are heated up during a fire test. Primarily, the heat from the flame, during a fire test, enters a QDC through convection which in turn is then transmitted across several of the QDC components until it reaches the housing through several different modes, as illustrated in FIG. 2. Once the thermal energy reaches the housing, it transfers some of the heat to toroidal sealing elements 96a and backup rings 102a via conduction. Toroidal sealing elements 96a receive heat through the housing but are also cooled by the sleeve 50a which is in constant contact with fluid flow 100 that has a cooling effect. Backup rings 102a are in contact with the housing but are not necessarily in contact with sleeve 50a.

The structure, function and operation of Zero Flow FP QDC 20 of this invention addresses the problems faced by existing QDCs by providing two improvements not utilized or appreciated in the prior art. As best seen in FIG. 5, one of the featured improvements pertains to the unique metal seal design that closes the extrusion gap 104 formed between the nipple and/or coupler housings, 128/28 and the sleeve 50. The metal seal design and structure are present in both coupler assembly 22 and nipple assembly 24 of Zero Flow FPQDC 20 and consists of a conventional elastomeric seal 96 and two unique backup rings, namely first ring 106 and second ring 108. First backup ring 106, best seen in FIGS. 7A, 7B and 7C, has a split, scarf, (diagonal—narrow angle) cut 110 and is constructed of a metallic composition, as for example, Aluminum Nickel Bronze, AMS 4640. First ring 106 has a dual angle sectional profile wherein the dual outwardly converging sides 112, 114, each have a predetermined vertical taper angle, e.g., such as about 20 degrees, with sides 112, 114 smoothly merging into a flat bottom or inside surface 116 and a parallel top or outer surface 118. Angled side surface 114 mates with pocket or recess angled adjacent wall 62. First ring 106 can also be described as being of generally truncated triangular shape, when viewed in cross section or of a generally triangular shape, with a radial plane passing through the longitudinal axis of each of the assemblies, and with a base surface thereof serving as the internal peripheral surface of ring 106. The dual angle design causes first ring 106 to be compressed radially against sleeve 50. This dual angle scarf cut construction allows first ring 106 to be loaded against the outer surface of sleeve 50 when QDC 20 is energized, with the internal pressure thus reducing extension gap 104 effectively to zero. This results in an effective metal to metal seal. In order to reduce extrusion gap 104 to an absolute minimum, e.g., almost to zero, sleeve 50 is preferably comprised of an aluminum bronze alloy whose coefficient of expansion upon heating is such that gap 104, is minimized as noted.

Second backup ring 108, best seen in FIGS. 6A and 6B, is interposed between toroidal sealing element 96 and first backup ring 106 and is also of similarly dual-angled and of a similar truncated, triangular design as first backup ring 106, with a base surface thereof serving as the outer peripheral surface of ring 108. Specifically, its dual inwardly converging sides 120, 122, each have a predetermined vertical taper angle, e.g., such as about 20 degrees, with sides 120, 122 smoothly merging into a flat bottom or outside surface 124 and a parallel top or inner surface 126. Angled side surface 120 mates with adjacent first ring side surface 112. The dual angularity of second backup ring 108 permits better energization of adjacent first ring 106 and also reduces the risk of improper initial installation. Second ring 108 is of a solid (no scarf cut) construction and manufactured preferably from polyetheretherketone (PEEK), VESPEL or other like materials, depending upon the type of service conditions it is expected to endure. The noted combination of an elastomeric toroidal sealing element 96 together with second backup ring 108 and split first metal backup ring 106 is utilized in the housing seal grooved 56 and 156, respectively of both coupler assembly 22 and nipple assembly 24 components of Zero Flow FP QDC 20.

Figure 10:
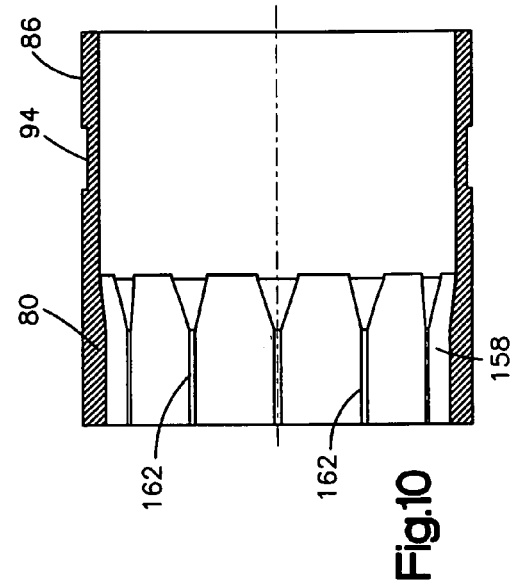
FIG. 10 is a longitudinal, vertical sectional view of the insulating sleeve of FIG. 9.
Figure 8A:
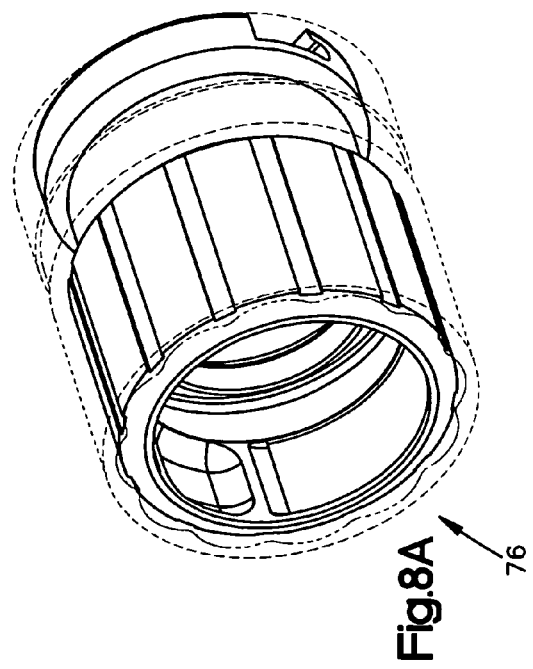
FIG. 8A is an isometric view of the improved actuating sleeve assembly, comprised of an inner actuating sleeve and a juxtaposed, superimposed outer insulating sleeve, of the QDC of the present invention.
Figure 9:
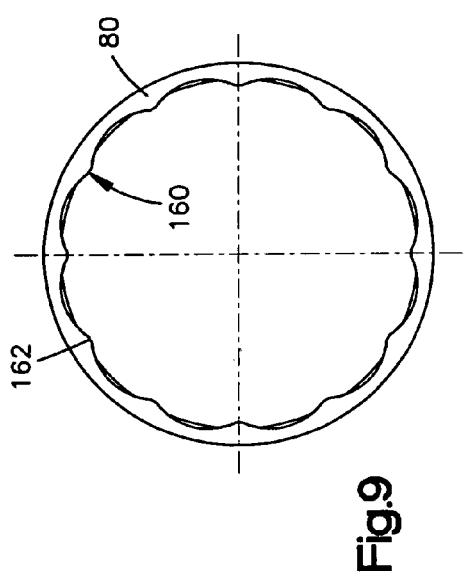
FIG. 9. is an end view of the insulating sleeve of the QDC of the present invention.

Another of the featured improvements of Zero Flow FP QDC 20 includes the use of insulation, with the insulation contained in Zero flow FP QDC 20 being provide by the addition of air gaps, with some of the air gaps having been created by machining voids between different moving parts as is illustrated in FIGS. 4A, 4B, 4C, 8A and 8B. Specifically, in actuating assembly 76 (FIG. 4A), the addition of an outer or superimposed insulating sleeve 80 around actuating sleeve 78 adds an additional peripheral insulating air space 82. Insulating sleeve 80 takes the form of a metallic, exteriorly patterned or knurled part (for better operator grip) that is interference-fitted, such as via press-fitting, onto the outer periphery of actuating sleeve 78. Insulating sleeve 80 is preferably manufactured of stainless steel, such as CRES 15-5PH, PER AMS 5659 material, or other like material. As best shown in FIGS. 9 and 10, insulating sleeve 80 has the noted peripheral pattern 86 on most of its outer peripheral surface, except for a recessed band portion 94. An increased diametral-thickness inner band 158 of sleeve 80, located approximately radially outwardly of balls 92 (FIGS. 4A, 4C), at actuating sleeve opposed band portion 166, is provided with a plurality of circumferentially inner, equally spaced scalloped recesses or machined radii 160, whose intersecting peaks or boundaries 162 provide a plurality of surfaces for the aforementioned interference-fitting of insulating sleeve 80 around actuating sleeve 78. When insulating sleeve 80 is exposed to a flame it expands at a rate greater than that of its interiorly extending actuating sleeve 78. This differential radial growth continues between parts 78 and 80 until a further plurality of peripherally spaced air gaps 164 (FIG. 8B) is created, particularly in noted band area 158, that insulates actuating sleeve 78 from direct conduction from the flame through insulating sleeve 80. These additional air or insulation gaps 164 reduce the temperature flux transmitted to the elastomeric seal cavities 56, 156 and allow this second feature of the Zero Flow FP QDC 20 to work in concert with the previously-noted improved seal assemblies 66.

It is deemed that one of ordinary skill in the art will readily recognize that the present invention fills remaining needs in this art and will be able to affect various changes, substitutions of equivalents and various other aspects of the invention as previously described herein. While the present invention has been described with reference to but one type of a Zero Flow QDC, namely a thread-lock type of QDC, this invention is deemed to be readily applicable to all types of Zero Flow QDCs. Thus, it is intended that the protection granted hereon be limited only by the scope of the appended claims and their equivalents.

What is claimed is:

1. In a zero flow fireproof quick disconnect coupling, for supplying fluid from a pressure source to an output conduit without leakage, said quick disconnect coupling being comprised of a female coupler assembly and a male nipple assembly adapted to be operatively interconnected via complementary fastening members;
   a. said female coupler assembly including:
      i. a first, generally tubular housing having a first axial through bore;
      ii. a generally cylindrical support member having a first portion thereof affixed to and enveloping an axial portion of said first housing, and a second portion provided with a first fastening member;
      iii. a hollow sleeve member, normally biased to a first position, located within an axial portion of said first housing bore;
      iv. a first sealing assembly, including a first elastomeric seal member, for sealing said sleeve member, relative to said first generally tubular housing;
      v. a stop assembly, including a generally tubular member having one end thereof affixed within said first through bore and extending through said sleeve member, said stop assembly having a further closed end and having a peripheral seal member adapted to seal said further closed end relative to a juxtaposed portion of said sleeve member at said first position;
      vi. an actuating sleeve, normally biased to a second position, surrounding said support member, said actuating sleeve being adapted for manual axial movement in a direction opposite to said second position;
   b. a male nipple assembly including:
      i. a second, generally tubular housing having an axial second through bore and a second fastening member;
      ii. an axially movable poppet, located within said second through bore, normally biased to a third position;
      iii. a second sealing assembly, including a second elastomeric seal member, for sealing said poppet, relative to said second through bore, in at least said third position; wherein the improvement comprises in combination:
   c. said first and second sealing assemblies being located in recesses in said first and second tubular housing bores respectively, with each recess including a first end wall having a predetermined first angle relative to the axial extent of said housings, each of said first and second elastomeric seal members taking the form of elastomeric toroidal sealing members and being located adjacent to second end walls axially spaced from said first end walls;
   d. each of said first and second sealing assemblies further including:
      i. a scarf-cut metallic first backup ring, of generally truncated triangular shape, in cross section, with the base thereof serving as the internal peripheral surface thereof, and a first angled side thereof being parallel with and abutting said first end wall of each of said sealing assembly recesses;
      ii. a non-metallic second backup ring, of generally truncated triangular shape, in cross section, with the base thereof serving as the outer peripheral surface thereof, and a third angled side thereof being parallel with and abutting a second angled side of said first backup ring, while a fourth angled side of said second backup ring is parallel with and abuts the side of said elastomeric toroidal sealing member opposite the side thereof that abuts each of said recess first end walls; and
   e. a metallic insulating sleeve, surrounding said actuating sleeve while being radially spaced therefrom, via a peripheral air gap, except for a band portion, at one end thereof, said band portion being interference-fitted on a corresponding portion of said actuating sleeve.

2. The improved quick disconnect coupling of claim 1, wherein said metallic first backup ring is comprised of an aluminum nickel bronze alloy.

3. The improved quick disconnect coupling of claim 1, wherein said non-metallic second backup ring is comprised of a polyetheretherketone material.

4. The improved quick disconnect coupling of claim 1, wherein said non-metallic second backup ring is comprised of a VESPEL material.

5. The improved quick disconnect coupling of claim 1, wherein said metallic insulating sleeve is comprised of a stainless steel alloy.

6. The improved quick disconnect coupling of claim 5, wherein the band portion of said insulating sleeve is provided with a plurality of axially extending, spaced scalloped recesses having spaced boundaries that provide a plurality of surfaces for the interference-fitting of said insulating sleeve around said actuating sleeve.

7. The improved quick disconnect coupling of claim 6, wherein said scalloped recesses are equally circumferentially spaced and axially directed, said boundaries having raised surfaces utilized for said interference-fitting.

8. The improved quick disconnect coupling of claim 7, wherein said interference-fitting is accomplished via press-fitting.

9. The improved quick disconnect coupling of claim 7, wherein each of said axially directed scalloped recesses creates an additional insulating air space between said insulating and actuating sleeves.

10. The improved quick disconnect coupling of claim 5, wherein the exterior peripheral surface of said insulating sleeve is provided with a pattern.

11. The improved quick disconnect coupling of claim 10, wherein said pattern takes the form of a knurl.

12. The improved quick disconnect coupling of claim 1, wherein the angulations of said first and second sides of said first back up ring are substantially equal.

13. The improved quick disconnect coupling of claim 1, wherein the angulations of said third and fourth sides of said second back up ring are substantially equal.

14. The improved quick disconnect coupling of claim 1, wherein the angulations of at least two of said first, second, third and fourth sides are all substantially equal.

15. The improved quick disconnect coupling of claim 1, wherein the predetermined first angles of said first end walls of said first and second sealing assemblies are oppositely directed.

16. The improved quick disconnect coupling of claim 15, wherein the axial arrangement of said toroidal seal member, together with said first and second backup rings, in said female coupling assembly is oppositely directed with reference to the axial arrangement of said toroidal seal member and the associated first and second backup rings in said male nipple assembly.

17. The improved quick disconnect coupling of claim 15, wherein the hollow sleeve member of said female coupler is comprised of an aluminum bronze alloy.

18. The improved quick disconnect coupling of claim 1, wherein the hollow sleeve member of said female coupler is comprised of an aluminum bronze alloy.

19. In a quick disconnect coupling, for supplying fluid from a pressure source to a pressure receiver without leakage, said coupling being comprised of a coupler assembly and a nipple assembly adapted to be operatively interconnected by an operator; said female member including:
  i. a first, generally tubular housing having a first longitudinal through bore;
  ii. a generally cylindrical support member having one portion thereof affixed to and surrounding a longitudinal portion of said housing;
  iii. a hollow sleeve member, normally biased to a first position, located within a longitudinal portion of said first housing through bore;
  iv. a first sealing assembly, including a first seal member, for sealing said sleeve member, relative to said first housing, said first sealing assembly being located in a first recess extending into said first housing bore;
  v. a stop assembly, including a generally tubular member having one end affixed within said first bore and extending through said sleeve member, said stop assembly also having another end, said another end incorporating a peripheral seal member for sealing said another end, relative to an adjacent portion of said sleeve member, when at said first position;
  vi. an actuating sleeve, normally biased to a second position, surrounding said support member, said actuating sleeve being adapted for axial movement, by an operator, in a direction opposite said second position; with said nipple assembly including:
  vii. a second, generally tubular housing having a longitudinal second through bore;
  viii. a longitudinally movable poppet, located within said second through bore, normally biased to a third position;
  ix. a second sealing assembly, including a second seal member, for sealing said poppet, relative to said second through bore and said sleeve member, said second sealing assembly being located in a second recess extending into said second housing bore; wherein an improvement comprises in combination:
    a. each of said first and second recesses for said respective first and second sealing assemblies, including a first end wall, angled relative to the longitudinal extents of said housings, with each of said first and second seal members taking the form of an elastomeric toroidal sealing member and being located adjacent to second end walls, in said housing recesses, longitudinally spaced from said first end walls;
    b. each of said first and second sealing assemblies further including:
      i. a non-continuous metallic first backup ring, of a generally triangular shape, in a radial plane passing through the longitudinal axis of said assemblies, with a base surface thereof serving as the internal peripheral surface thereof, and a first angled side thereof being complementary with the first end walls of each of said sealing recesses;
      ii. a non-metallic second backup ring, of generally truncated triangular shape, in a radial plane passing through the longitudinal axis of said assemblies, with a base surface thereof serving as the outer peripheral surface thereof, and a third angled side thereof being complementary with a second angled side of said first backup ring, while a fourth angled side of said second backup ring is complementary with the side of said toroidal sealing member that is opposite to the side thereof that abuts each of said recess first end walls; and
    c. a metallic insulating sleeve, surrounding said actuating sleeve while being substantially fully radially spaced therefrom, via a substantially continuous peripheral insulating air gap, except for a band portion, at one end of said insulating, sleeve, with said band portion being press-fitted on a corresponding portion of said actuating sleeve, in a manner so as to provide a plurality of further separate longitudinally extending insulating air gaps.

20. The improved quick disconnect coupling of claim 19, wherein the hollow sleeve member of said female coupler is comprised of an aluminum bronze alloy.

21. The improved quick disconnect coupling of claim 20, wherein said metallic first backup ring is provided with a scarf cut and is comprised of an aluminum nickel bronze composition.

22. The improved quick disconnect coupling of claim 20, wherein said non-metallic second backup ring is comprised of a polyetheretherketone composition material.

23. The improved quick disconnect coupling of claim 20, wherein said non-metallic second backup ring is comprised of a VESPEL composition material.

24. The improved quick disconnect coupling of claim 19, wherein said metallic insulating sleeve is comprised of a stainless steel alloy material.

25. The improved quick disconnect coupling of claim 19, wherein said further longitudinally extending insulating air gaps are formed via a plurality of longitudinally extending, spaced, scalloped recesses on the inner surface of said band portion.

26. The improved quick disconnect coupling of claim 25, wherein said scalloped recesses include spaced boundaries that form a plurality of surfaces for the press-fitting of said insulating sleeve around said actuating sleeve.

27. The improved quick disconnect coupling of claim 19, wherein the exterior peripheral surface of said insulating sleeve is provided with a knurled pattern.

28. The improved quick disconnect coupling of claim 19, wherein the angulations of at least two of said first, second, third and fourth sides of said first and second back up rings respectively, are substantially equal.

29. The improved quick disconnect coupling of claim 19, wherein the angulations of said the first, second, third and fourth sides of said first and second back up rings respectively, are substantially equal.

30. The improved quick disconnect coupling of claim 19, wherein the longitudinal placement of said seal member, together with the first and second backup rings in said coupling assembly, is mirror image relative to the placement of the seal member and the first and second backup rings of said nipple assembly.

* * * * *